United States Patent
Lambert

(10) Patent No.: US 9,331,505 B2
(45) Date of Patent: May 3, 2016

(54) CHARGING SYSTEM

(75) Inventor: Michael Lambert, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1094 days.

(21) Appl. No.: 13/412,808

(22) Filed: Mar. 6, 2012

(65) Prior Publication Data

US 2013/0234656 A1 Sep. 12, 2013

(51) Int. Cl.
*H02J 7/00* (2006.01)

(52) U.S. Cl.
CPC .................................. *H02J 7/0042* (2013.01)

(58) Field of Classification Search
CPC .............................. H02J 7/025; H02J 7/0042
USPC .................................. 320/107, 108, 134, 150
See application file for complete search history.

(56) References Cited

U.S. PATENT DOCUMENTS

| 7,726,391 | B2 | 6/2010 | Seo et al. |
| 2007/0152633 | A1* | 7/2007 | Lee .............................. 320/114 |
| 2007/0279002 | A1* | 12/2007 | Partovi ......................... 320/115 |
| 2008/0245501 | A1 | 10/2008 | Kang et al. |

FOREIGN PATENT DOCUMENTS

| CN | 101292377 | 4/2011 |
| CN | 101449406 A | 6/2011 |
| GB | 2475772 | 6/2011 |
| JP | 2008198860 A | 8/2008 |
| JP | 2009119890 | 6/2009 |
| JP | 2010143501 | 7/2010 |
| JP | 2011109546 A | 6/2011 |

* cited by examiner

*Primary Examiner* — Edward Tso
*Assistant Examiner* — Aaron Piggush
(74) *Attorney, Agent, or Firm* — Dinsmore & Shohl LLP

(57) ABSTRACT

A charging system for regulating the temperature of an electronic device. The charging system includes a base having a top surface configured to support the electronic device. The base is configured to draw heat away from the electronic device. The base may include at least one channel disposed along the top surface. A charger is operable to electrically charge the electronic device and a blower is configured to blow air along the channel so as to facilitate cooling of the electronic device during charging operations.

10 Claims, 4 Drawing Sheets

CHARGING SYSTEM

FIELD OF THE INVENTION

The invention relates to a charging system for regulating the temperature of an electronic device. More particularly, the charging system includes a base having a top surface configured to support the electronic device. The base is operable to draw heat from the electronic device.

BACKGROUND OF THE INVENTION

Charging systems for charging electronic devices are currently known and used. Some charging systems use electromagnetic induction to wirelessly provide electrical power to an electronic device while others use an electrical cable. In both instances charging of an electronic device increases the temperature of the electronic device. Further, the temperature of electronic devices may also increase through normal use. Therefore, the internal components may deteriorate over time, to include the battery of the electronic device. Accordingly, it remains desirable to have a charging system operable to help reduce the temperature of the electronic device during charging operations and use. It also remains desirable to have a charging system operable to automatically cool the electronic device during charging operations and use. Further, it remains desirable to have a charging system operable to draw heat from the electronic device and convert the heat into electricity.

SUMMARY OF THE INVENTION AND ADVANTAGES

A charging system for regulating the temperature of an electronic device is provided. The charging system includes a base configured to draw heat from the electronic device. In one embodiment, the base includes a top surface configured to support the electronic device. The base further includes at least one channel disposed along the top surface of the base. The channels extend along an axis and forms a passage for air to flow along the under surface of the electronic device.

A charger is operable to electrically charge the electronic device and a blower is configured to blow air onto the electronic device. The charging system may further include a vent having a plurality of adjustable slats may be disposed downstream the blower and upstream the channel of the base. The vent may be configured to direct air from the blower along the channel so as to facilitate cooling of the electronic device during charging operations. The directed air travels along the underside of the electronic device along the path defined by the channels so as to circulate air across the body of the electronic device facilitating the cooling of the device during charging operations.

The channel may be formed in a number of ways. In one embodiment, the base has an undulating top surface. The undulations form the channels and air is blown along those channels. Alternatively, the channels may be formed by a plurality of panels. Each of the plurality of panels extends from one end of the base to the other end of the base along an axis. Each of the plurality of panels is spaced apart and parallel to each other so as to form a plurality of channels. In yet another illustration, the top surface has at least one pair of angled walls. The angled walls are angled relative to each other so as to form a ramp-shaped surface wherein the top of the ramp-shaped surface supports the base of the electronic device. The bottom portion of each of the pair of adjoining angled walls are joined together and spaced apart from the handheld device so as to form channels through which air may be directed. Thus, the channels may be formed multiple ways, and the embodiments provided herein are meant to be illustrative and not limiting.

The charger may be an inductive charging unit disposed beneath the base. The inductive charging unit may be a coil, or printed circuit board. The inductive charging unit is operable to deliver power to a device by means of near field magnetic induction to the electronic device. Alternatively, the charger may be a wire electrically connecting the electronic device to a power source, or other wireless charging systems such as a charging system commonly referenced as Wi-tricity.

The charging system may further include a first sensor operable to detect the temperature of the electronic device. A processor may be configured to receive a signal from the first sensor. The processor is operable to process the signal and actuate the blower when the electronic device reaches a predetermined temperature.

The charging system may further include a first actuator operable to actuate the blower. The first actuator may be a button or dial located on the vehicle console, and actuated by a user for manual operation of the charging system. Alternatively, the first actuator may be actuated by the processor for automated operation of the charging system. Specifically, the processor may actuate the actuator so as to turn on the blower when the first sensor detects that the electronic device has reached a predetermined temperature.

A second actuator may be provided to manually actuate the charger. Alternatively, the charger may be automatically actuated. For instance, the charging system may include a second sensor operable to detect the presence of an electronic device on the base. The processor may be further operable to actuate the charger when the electronic device is detected on the base.

Thus the charging system may be configured for automated charging wherein upon detection of an electronic device on the base the processor actuates the second actuator so as to actuate the charger, and whereupon the first sensor may actuate the blower when the electronic device reaches a predetermined temperature and may turn off the blower when the temperature of the electronic device falls below the predetermined temperature threshold.

In a second embodiment, the base includes a material operable to draw heat from the electronic device. Thus, the base acts as a heat sink. The base is electrically connected to a thermoelectric device operable to convert the heat generated from the electronic device into electrical energy. Any thermoelectric device currently known and used in the art may be adaptable for use herein. The electricity may be used or stored in a capacitor for later use to supplement the electrical demands of the vehicle or other auxiliary devices. As described above, the charging system of the second embodiment may be manually or electronically actuated.

Accordingly, the charging system regulates the temperature of the electronic device during charging operations and use.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
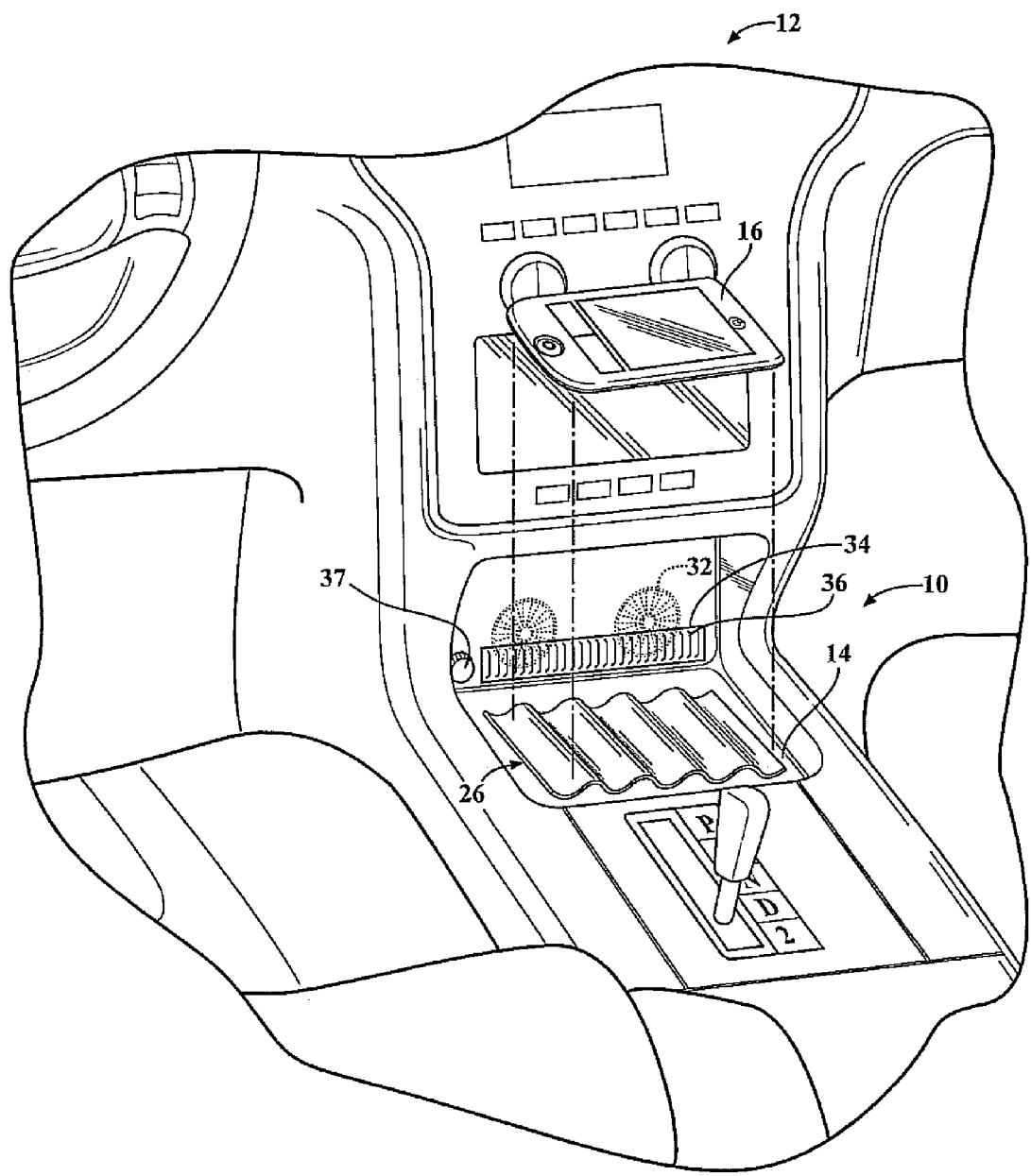
FIG. 1 is a perspective view of the first preferred embodiment of the charging system.

With reference now to FIGS. 1-5, a first preferred embodiment of a charging system 10 is provided. The charging system 10 is illustratively shown used in an automotive vehicle 12, but those skilled in the art should appreciate that the charging system 10 may be used in other applications. For illustrative purposes, the charging system 10 is disposed on the front console of the automotive vehicle 12 just adjacent the shifter, but may be located in other areas of the automotive vehicle 12 to include the center console or a rear passenger console.

A charger 14 is operable to electrically charge the electronic device 16. The charger 14 may be an inductive charging unit 18. The inductive charging unit is shown as a charging coil 18 and is electrically coupled to the vehicle's battery 20. As is known in the art, an electric current supplied to the inductive charging coil 18 causes the inductive charging coil 18 to produce an electromagnetic field operable to inductively charge an electronic device 16 having a receiving coil.

Figure 6:
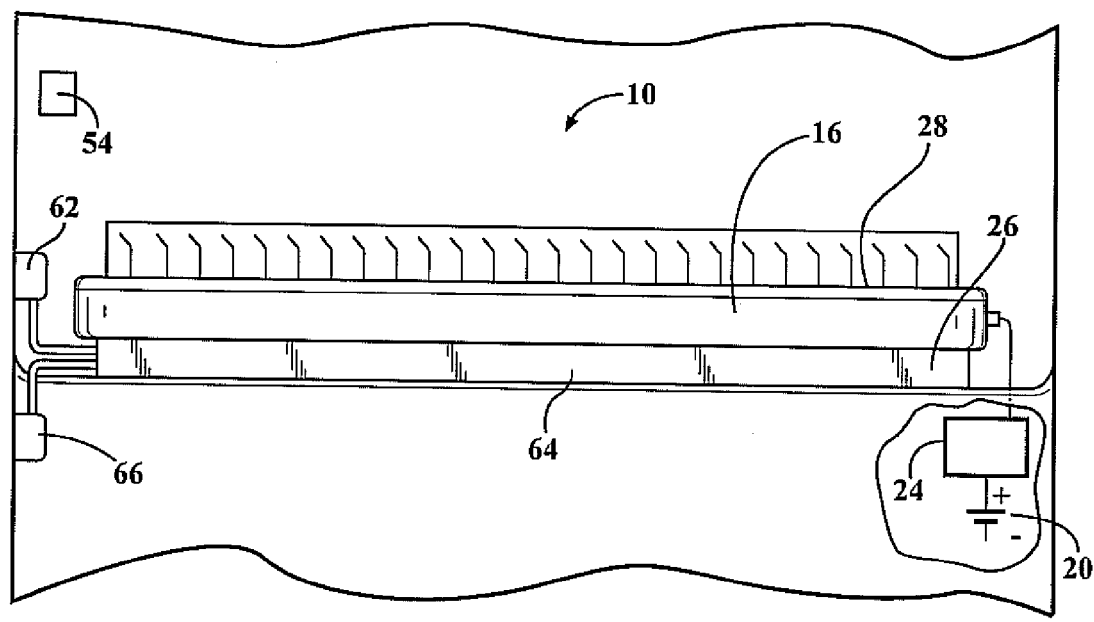
FIG. 6 is a perspective view of a second preferred embodiment of the charging system.

Alternatively, as shown in FIG. 6, the charger 14 may be a wire 22 electrically connecting the electronic device 16 to a power source such as a vehicle's battery 20. The charger 14 may include circuitry 24 operable to transform power from the vehicle's battery 20 to an electric current optimal for charging the electronic device 16.

With reference again to FIGS. 1-5, the charging system 10 includes a base 26 having a top surface 28 configured to support the electronic device 16. The base 26 includes at least one channel 30 disposed along the top surface 28. The channel 30 extends between opposite ends of the base 26. It should be appreciated by those skilled in the art that the base 26 is formed of a nonconductive material when used with a charger 14 operable to deliver an inductive charge. Such nonconductive material illustratively includes a polymer-based material such as rubber or plastic. Preferably the base 26 is 2.5 millimeters thick so as to minimize the distance between the inductive charging coil 18 and the receiving coil of the electronic device 16. In instances where the charger 14 is wired to the electronic device 16, the material of the base 26 is sufficient in strength and durability to support the weight of the electronic device 16.

The charging system 10 further includes a blower 32 configured to blow air along the channel 30 so as to facilitate cooling of the electronic device 16 during charging operations and use. The charging system 10 may include a vent 34 disposed downstream the blower 32 and upstream the channel 30. The vent 34 may include a plurality of slats 36. The slats 36 may be adjustable so as to direct air from the blower 32 along the channels 30 of the base 26. For illustrative purposes, the slats 36 are shown aligned vertically and spaced apart from each other. The slats 36 may be rotated by a dial 37 disposed on the face of the instrument panel. The dial 37 is operable to angle the slats so as to align the flow of air along the channels 30. Alternatively, the slats 36 may be fixed so as to direct air from the blower 32 along the channels 30 of the base 26.

As shown, the channels 30 are formed along an axis extending along the length of the automotive vehicle 12. The blower 32 is positioned upstream the channels 30 and is operable to blow air along the length of the channel 30 so as to allow air to pass between an undersurface of the electronic device 16 and a top surface 28 of the base 26. Thus, air blown along the channel 30 helps maintain the electronic device 16 at a desired temperature during charging operations.

Figure 2:
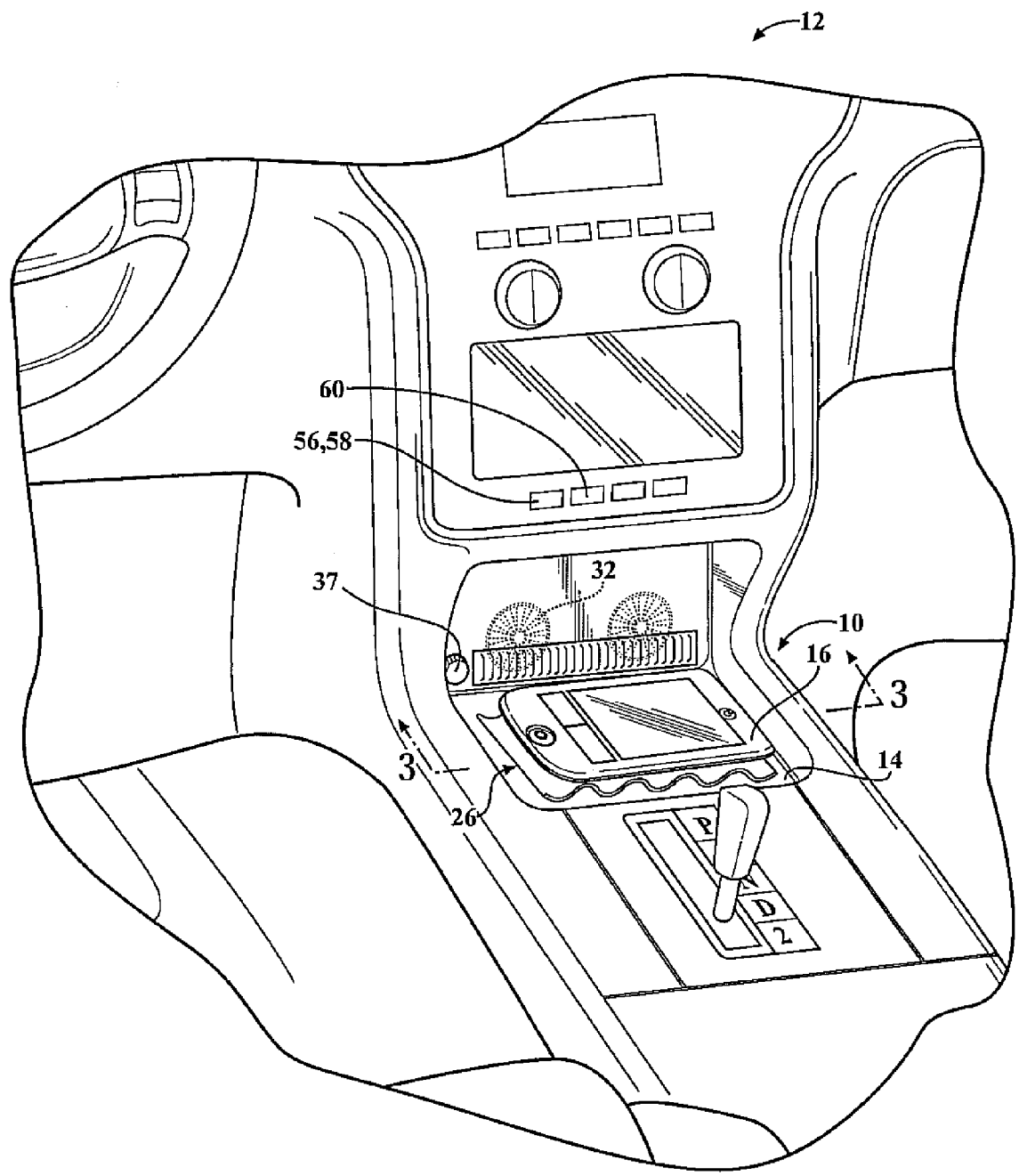
FIG. 2 is a perspective view of the charging system of FIG. 1, showing an electronic device placed on the base.
Figure 3:
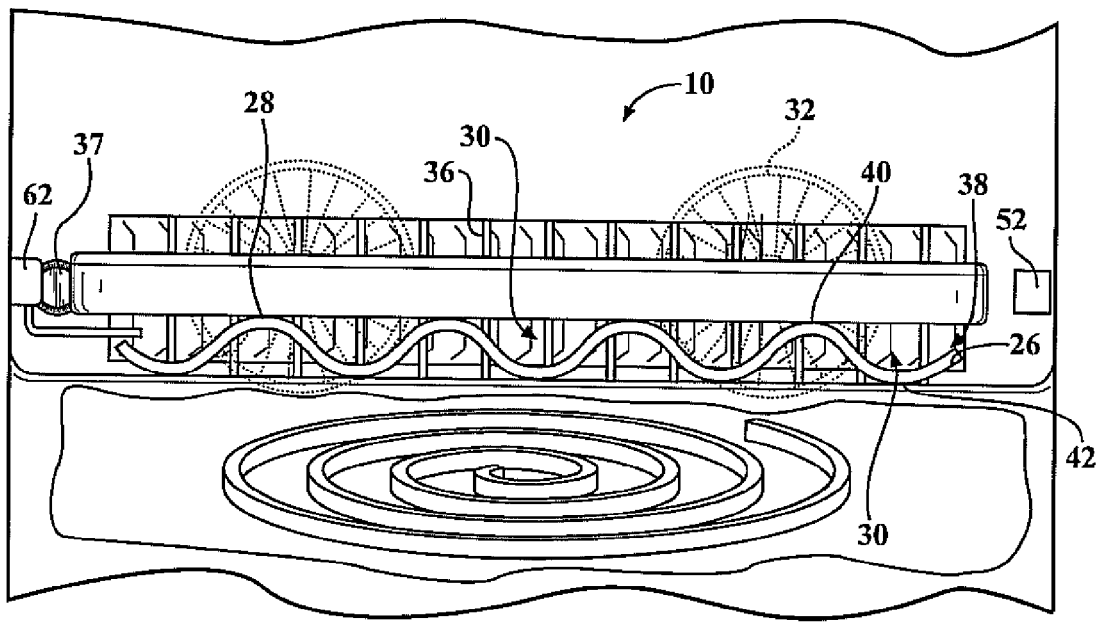
FIG. 3 is a cross-sectional view of the of the charging system of FIG. 2 taken along lines 3-3.

With reference now to FIGS. 1-3, the charging system 10 is illustrated showing channels 30 formed by grooves on the top surface 28 of the base 26. Specifically, the top surface 28 of the base 26 is undulating 38 so as to form a sinusoidal cross section as shown in FIG. 3. The undulating 38 surfaces include a contact portion 40 and a bottom portion 42. The contact portions 40 generally lay along the same plane and the electronic device 16 is supported by the contact portions 40 of the undulating 38 surface. The bottom portions 42 are spaced apart from the undersurface of the electronic device 16 so as to form channels 30 through which air may pass and cool the electronic device 16 during charging operations. The blower 32 may be coupled to the vehicle's existing HVAC system and passed through a vent 34 disposed on the console so as to direct cool or ambient air along the channels 30 of the base 26.

Figure 4:
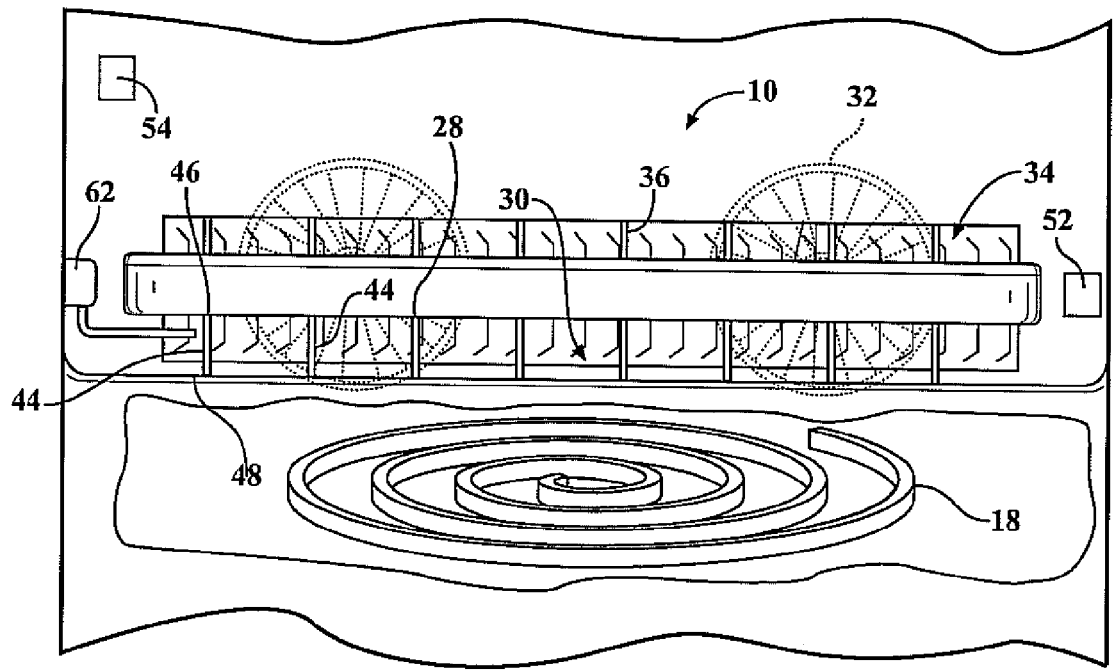
FIG. 4 is a cross-sectional view of the charging system showing the base having a plurality of spaced apart panels forming the channel.

It is anticipated that the channels 30 may be formed in a number of different ways. With reference now to FIG. 4, the channels 30 are formed by a plurality of panels 44. Each of the plurality of panels 44 extends along an axis and each of the plurality of panels 44 is spaced apart and parallel to the other so as to form a plurality of channels 30. The panels 44 have a top edge 46 and a bottom edge 48. The top edge 46 is operable to support the bottom surface of the electronic device 16 and the blower 32 is configured to blow air along the channels 30 formed by the spaced apart panels 44.

Figure 5:
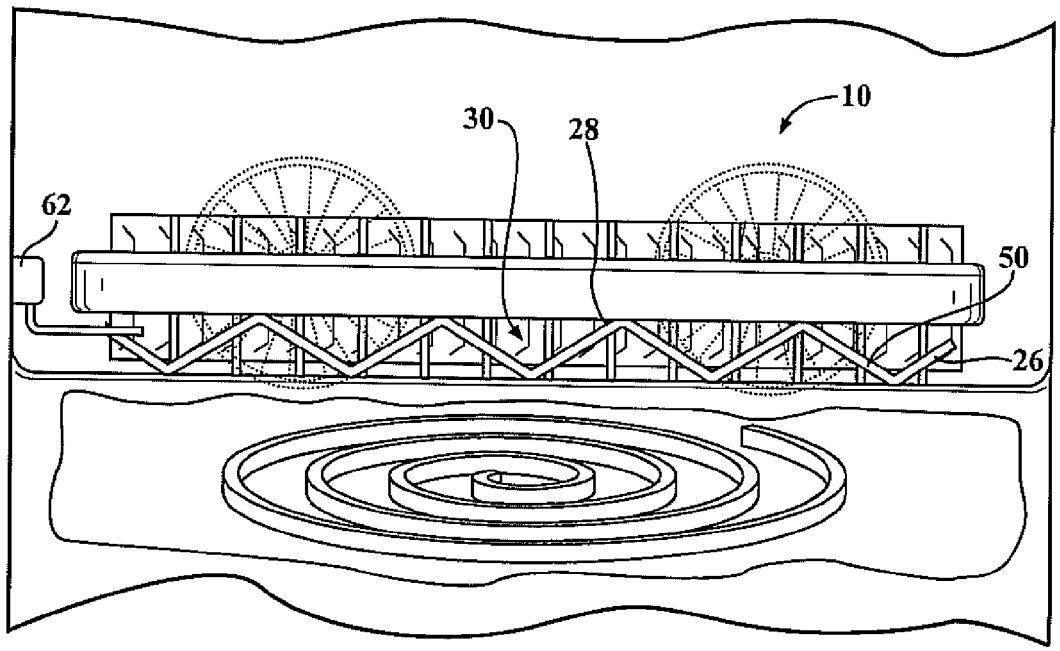
FIG. 5 is a cross-sectional view of the charging system showing the base having a plurality of ramp-shaped surfaces forming the channel.

With reference now to FIG. 5, the channels 30 are formed by pairs of angled walls 50. Each of the at least one pair of angled walls 50 is angled relative to the other so as to form a plurality of channels 30. The angled walls 50 are angled relative to each other so as to form a ramp-shaped surface wherein the top of the ramp-shaped surface supports the base 26 of the electronic device 16. The bottom portion 42 of each of the pair of adjoining angled walls 50 adjoined together and spaced apart from the handheld device so as to form channels 30 through which air may be directed. Thus it should be appreciated by those skilled in the art that the channels 30 may be formed in a number of ways and the illustrations provided herein are for illustrative purposes and are in no way meant to be in the form of limitation.

The charging system 10 may further include a first sensor 52 operable to detect the temperature of the electronic device 16. Such sensors are currently known and used in the art and any such sensor may be adaptable for use herein to include a thermostatic sensor or an infrared sensor. The first sensor 52 is operable to provide the signal to a processor 54.

The processor 54 is configured to process the signal from the first sensor 52 and calculate a temperature of the electronic device 16. The processor 54 may be further operable to actuate the blower 32 when the electronic device 16 reaches a predetermined temperature. Thus actuation of the blower 32 may be automated based upon the temperature of the electronic device 16.

Alternatively, the charging system 10 may include a first actuator 56 configured to actuate the blower 32. The first actuator 56 may be a button 58 configured to manually actuate the blower 32. For instance, when used in an automotive vehicle 12 the console may include a button 58 operable to actuate the blower 32 so as to cool the electronic device 16 during charging operations. In such a case, the processor 54 may send a signal to the user that the temperature of the electronic device 16 is above a predetermined threshold, and thus the user may manually actuate the blower 32. For instance, the processor 54 sends a signal to the user when the temperature of the electronic device 16 is above 30 degrees Celsius. However, it should be appreciated by those skilled in the art that the threshold is reflective of the operating specifications of the electronic device. Thus, in instances where the electronic device 16 is operating, but not being charged, the charging system 10 may still cool the electronic device 16 when the electronic device 16 becomes heated through normal operation.

The device may further include a second actuator 60 configured to actuate the charger 14. A second sensor 62 is operable to detect the presence of the electronic device 16 on the base 26. The second sensor 62 may be a load sensor, or an infrared sensor operable to detect a break in an infrared signal. The second sensor 62 transmits a signal to the processor 54 when an electronic device 16 is detected on the base 26, and the processor 54 is further operable to actuate the charger 14 when the electronic device 16 is detected on the base 26.

In instances where the charger 14 is an inductive charging coil 18, the processor 54 may be operable to actuate the charger 14 when a receiving coil from the electronic device 16 is in a condition to receive an inductive charge from the charger 14. Thus the electronic device 16 may include a program for establishing a handshake between the inductive charging coil 18 of the base 26 and the receiving coil of the electronic device 16.

With reference now to FIG. 6, a second preferred embodiment of the charging system 10 is provided. In the second preferred embodiment the base 26 includes a material operable to draw heat from the electronic device 16. Such materials illustratively include ceramic, thermally conductive polyethylene or the like. The base 26 is a heat sink 64. The heat sink 64 is electrically connected to a thermoelectric device 66 operable to convert the heat generated from the electronic device 16 into electrical energy. Any thermoelectric device 66 currently known and used in the art may be adapted for use herein. The electricity may be used or stored in a capacitor for later use to supplement the electrical demands of the vehicle or other auxiliary devices.

In operation, the user places the electronic device 16 on the base 26. Preferably, the undersurface of the electronic device 16 is laid on top of the base 26. The electronic device 16 may be charged either through a wire 22 or inductively. The charger 14 may be manually or automatically actuated as described above. For instance, a second actuator may be configured to actuate the charger. The charging system of the second preferred embodiment may further include a second sensor 62 operable to detect the presence of an electronic device 16 on the base 26. The processor 54 is further operable to actuate the charger 14 when the electronic device 16 is detected on the base. Alternatively, the user may manually actuate the charger.

The temperature of the electronic device 16 increases through either charging operations or during normal use. As the temperature increases, the base 26 draws the heat away from the electronic device 16 to the thermoelectric device 66 wherein the heat is converted into electricity. The electricity may be used to augment the automotive vehicles electrical demands, or may be stored for later use.

Accordingly the charging system 10 is operable to regulate the temperature of an electronic device 16 during charging operations. Regulating the temperature of the electronic device 16 during charging operations and use helps maintain the life of the battery of the electronic device 16, as well as maintain the integrity of electrical circuitry 24 within the electronic device 16. Obviously many modifications and variations of the present invention are possible in light of the above teachings and may be practiced otherwise than as specifically described while within the scope of the appended claims.

The invention claimed is:

1. A charging system for charging an electronic device, the charging system comprising:
a base having a bottom surface disposed on a generally horizontal plane and top surface raised with respect to the bottom surface so to form a channel having a longitudinal axis, the top surface configured to support the electronic device;
a charger operable to electrically charge the electronic device; and
a blower configured to blow air coaxially along the longitudinal axis so as to blow air along a back side of the electronic device and along the channel to facilitate cooling of the electronic device during charging operations.

2. The charging system as set forth in claim 1, wherein the base includes a plurality of top surfaces, each of the plurality of top surfaces raised with respect to the base so as to form a plurality of channels between each of the top surfaces, each of the plurality of channels extending along a respective longitudinal axis, the blower configured to blow air along at least one of the plurality of channels.

3. The charging system as set forth in claim 1, wherein the top surface includes at least one pair of angled walls, one of the at least one pair of angled walls is angled relative to the other one of the at least one pair of angled walls, so as to form at least one of the plurality of channels.

4. The charging system as set forth in claim 1, further including a first sensor operable to detect the temperature of the electronic device.

5. The charging system as set forth in claim 4, further including a processor configured to receive a signal from the first sensor, the processor configured to process the sensor and actuate the blower when the electronic device reaches a predetermined temperature.

6. The charging system as set forth in claim 1, further including a first actuator configured to actuate the blower.

7. The charging system as set forth in claim 1, wherein the charger is an inductive charging unit disposed beneath the base, the inductive charging unit operable to deliver an inductive charge to the electronic device.

8. The charging system as set forth in claim 7, further including a second actuator configured to actuate the charger.

9. The charging system as set forth in claim 5, further including a second sensor operable to detect the presence of an electronic device on the base, the processor further operable to actuate the charger when the electronic device is detected on the base.

10. The charging system as set forth in claim 9, wherein the charger is an inductive coil disposed beneath the base, the inductive charging coil operable to deliver an inductive charge to the electronic device.

* * * * *

UNITED STATES PATENT AND TRADEMARK OFFICE
CERTIFICATE OF CORRECTION

PATENT NO.        : 9,331,505 B2
APPLICATION NO.   : 13/412808
DATED             : May 3, 2016
INVENTOR(S)       : Michael Lambert It is certified that error appears in the above-identified patent and that said Letters Patent is hereby corrected as shown below:

In the Claims

In Column 6, Claim 8, Line 52, after "The charging system as set forth in claim" delete "7" and insert --6--, therefor.

Signed and Sealed this
Ninth Day of August, 2016

Michelle K. Lee
*Director of the United States Patent and Trademark Office*